United States Patent [19]
Raad et al.

[11] Patent Number: 5,632,503
[45] Date of Patent: May 27, 1997

[54] METHOD FOR ALLOWING ENHANCED DRIVER SELECTION OF SUSPENSION DAMPING AND STEERING EFFORTS

[75] Inventors: Joseph M. Raad, Southgate; Steven J. Reimers, Allen Park; Ray A. Sackett, Monroe; Ronald J. Collins, Dearborn; Christine L. Gordon, Novi, all of Mich.

[73] Assignee: Ford Motor Company, Dearborn, Mich.

[21] Appl. No.: 574,483

[22] Filed: Dec. 19, 1995

[51] Int. Cl.$^6$ .................................. B60G 11/26
[52] U.S. Cl. ........................................ 280/707
[58] Field of Search ................................ 280/707

[56] References Cited

U.S. PATENT DOCUMENTS

| | | | |
|---|---|---|---|
| 4,621,833 | 11/1986 | Soltis | 280/707 |
| 5,400,245 | 3/1995 | Butsuen et al. | 280/707 |
| 5,401,052 | 3/1995 | Yoshioka et al. | 280/707 |

*Primary Examiner*—Kenneth R. Rice
*Attorney, Agent, or Firm*—Gregory P. Brown, Esq.; Roger L. May, Esq.

[57] ABSTRACT

A method for allowing enhanced driver selection of suspension damping and steering efforts for a motor vehicle includes the steps of presenting to a driver of the motor vehicle a plurality of suspension damping modes and steering efforts modes for the motor vehicle, allowing the driver to select only predetermined combinations of the suspension damping modes and steering efforts modes, and adjusting the suspension damping and steering efforts of the motor vehicle based on the predetermined combination selected by the driver, and automatically adjusting the modes based on predetermined conditions.

20 Claims, 2 Drawing Sheets

METHOD FOR ALLOWING ENHANCED DRIVER SELECTION OF SUSPENSION DAMPING AND STEERING EFFORTS

BACKGROUND OF THE INVENTION

1. Field of the Invention

The present invention relates generally to vehicles and, more specifically, to a method for allowing enhanced driver selection of suspension damping and steering efforts for a motor vehicle.

2. Description of the Related Art

It is known to provide adjustable suspension damping and steering efforts, both manual and automatic, for motor vehicles such as automotive vehicles. The adjustable suspension damping includes adjustable front and rear semi-active dampers. In conventional fashion, the front semi-active dampers help to control the vibrations of the front of the vehicle and the rear semi-active dampers help to control the vibrations of the rear of the vehicle. The adjustable suspension damping allows the driver to select FIRM, NORMAL and PLUSH damping modes. The adjustable steering efforts include a power steering apparatus in which the amount of the steering assist is adjustable. In conventional fashion, the power steering apparatus allows the driver to select LOW, NORMAL and HIGH steering effort modes.

On motor vehicles equipped with both adjustable suspension damping and steering efforts, it is possible that some combinations of steering effort modes and suspension damping modes are better than others for vehicle dynamic considerations. As a result, there is a need in the art to link the modes for steering efforts and suspension damping such that only combinations that enhance vehicle dynamics are allowed and combinations that degrade vehicle dynamics are avoided. There is also a need in the art to override the driver selected suspension damping mode and use the most appropriate suspension damping mode depending on the driving and road conditions.

SUMMARY OF THE INVENTION

Accordingly, the present invention is a method for allowing enhanced driver selection of suspension damping and steering efforts for a motor vehicle. The method includes the steps of presenting to a driver of the motor vehicle a plurality of suspension damping modes and a plurality of steering efforts modes for the motor vehicle, allowing the driver to select only predetermined combinations of the suspension damping modes and the steering efforts modes, and adjusting the suspension damping and steering efforts of the motor vehicle based on the predetermined combination selected by the driver.

One advantage of the present invention is that a method is provided for allowing enhanced driver selection of suspension damping and steering efforts for a motor vehicle. Another advantage of the present invention is that the method links the modes for steering efforts and suspension damping such that only combinations that enhance vehicle dynamics are allowed and combinations that degrade vehicle dynamics are avoided. Yet another advantage of the present invention is that the method allows the suspension damping mode to be changed automatically without driver input to enhance vehicle dynamic performance under certain conditions. A further advantage of the present invention is that the method allows wider tuning of the suspension damping and steering efforts. Yet a further advantage of the present invention is that the method automatically overrides a driver selected suspension damping mode on a motor vehicle to enhance the vehicle dynamics and driver confidence over a wide variety of driving situations.

Other features and advantages of the present invention will be readily appreciated as the same becomes better understood after reading the subsequent description taken in conjunction with the accompany drawings.

DESCRIPTION OF THE PREFERRED EMBODIMENT(S)

The present invention is a method for integrating vehicle dynamic systems for a motor vehicle. The method includes providing a plurality of vehicle dynamic systems for the motor vehicle. The vehicle dynamic systems include, but are not limited to, a suspension damping system, steering efforts system, brake system, and traction control system. The method allows interaction between the vehicle dynamic systems. The vehicle dynamic systems interact through an electronic control unit which also receives inputs from the vehicle dynamic systems and various sensors and switches, calculates values, and outputs commands to the vehicle dynamic systems. The method includes adjusting at least one of the vehicle dynamic systems based on predetermined conditions of at least another of the vehicle dynamic systems. For example, the steering efforts system may be adjusted to predetermined steering efforts modes based on a suspension damping mode of the suspension damping system. The subsequent description is merely one example of interaction between two vehicle dynamic systems. It should be appreciated that interaction may occur between more than two vehicle dynamic systems and one vehicle dynamic system may be adjusted relative to the other vehicle dynamic systems.

Figure 1:
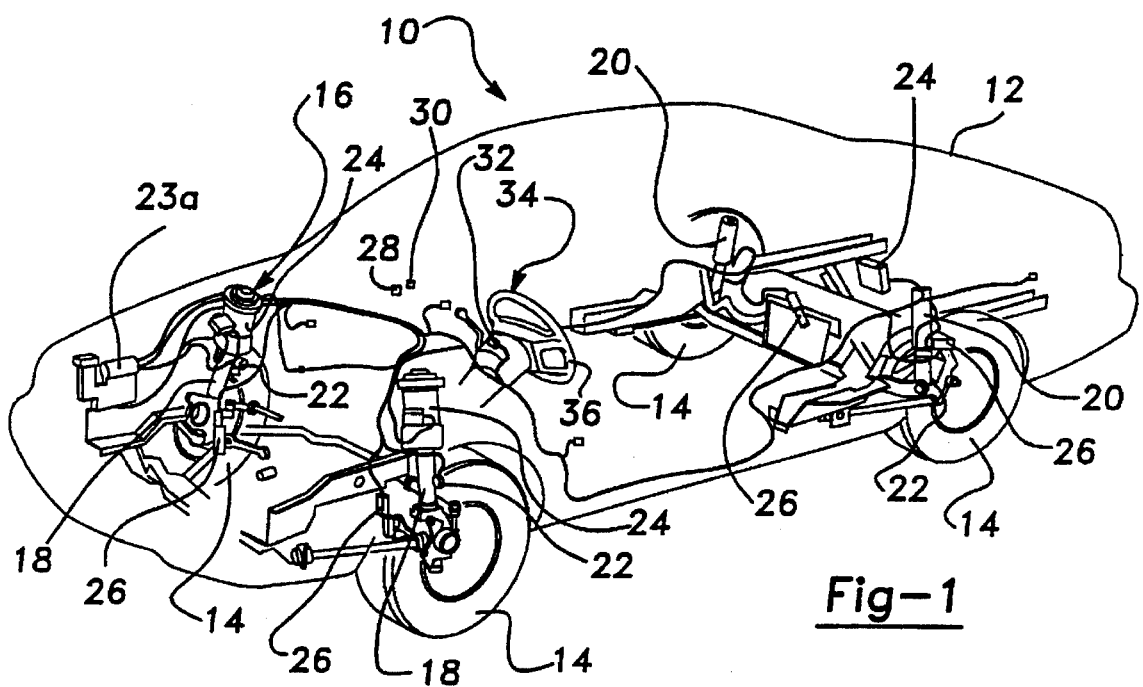
FIG. 1 is a perspective view of a motor vehicle employing a method, according to the present invention, for allowing enhanced driver selection of suspension damping and steering efforts for the motor vehicle.

Referring to FIG. 1, one embodiment of a motor vehicle 10 such as an automotive vehicle is partially shown. The motor vehicle 10 includes a vehicle body 12, wheels 14 and a first vehicle dynamic system such as an adjustable suspension system, generally indicated at 16, for supporting the vehicle body 12 upon the wheels 14. It should be appreciated that the adjustable suspension system 16 damps the vehicle body 12 relative to the wheels 14.

The adjustable suspension system 16 includes adjustable front semi-active shocks or dampers 18 and rear semi-active shocks or dampers 20 disposed between the vehicle body 12 and the wheels 14. The adjustable front and rear semi-active dampers 18 and 20 are preferably constructed in a known manner and each include a semi-active damper actuator 22 to control a rotary valve positioned within one passageway running through a piston of the damper. The rotary valve functions to vary the effective cross sectional area of the passageway, thus providing an adjustable damping force such as soft and hard. It should be appreciated that the semi-active dampers 18 and 20 and their damping forces are conventional and known in the art. It should also be appreciated that the adjustable suspension system 16 may include an air spring 24 associated with each front and rear semi-active damper 18 and 20.

The adjustable suspension system 16 includes an electronic control unit 24 electrically connected to each damper actuator 22. The adjustable suspension system 16 also includes a height sensor 26 associated with each wheel 14 and electrically connected to the electronic control unit 24 to sense the height of the vehicle body 12 relative to the wheel 14. The adjustable suspension system 16 further includes a select switch 28 electrically connected to the electronic control unit 24 for selecting a mode of a plurality of modes and a ride/steer switch 30 electrically connected to the electronic control unit 24 for selecting the modes to be suspension damping or steering efforts. The adjustable suspension system 16 further includes an ignition switch 32 electrically connected to the electronic control unit 24 for starting the motor vehicle 10. It should be appreciated that the driver is presented with suspension damping and steering efforts menu by pushing the ride/steer switch 30 and that once either the suspension damping or steering efforts menu has been chosen, the driver selects suspension damping mode or steering efforts mode by pushing the select switch 24.

The electronic control unit 24 receives inputs from the height sensors 26, select switch 28, ride/steer switch 30, ignition switch 32, and other sensors (not shown). In return, the electronic control unit 24 outputs commands to each damper actuator 22 for controlling the damping force of the semi-active dampers 18 and 20. Those skilled in the art will appreciate in view of this disclosure that the processor within the electronic control unit 24 and its associated peripheral equipment could be structured according to several different architectures. In this embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data is being processed. It should be appreciated that the electronic control unit 24 is conventional and known in the art.

The motor vehicle 10 also includes a second vehicle dynamic system such as an adjustable steering efforts system, generally indicated at 34, for steering the wheels 14 of the vehicle 10 by the driver. The adjustable steering efforts system 34 includes a steering wheel 36 operatively connected in a known manner to a steering actuator (not shown) to adjust the amount of steering assist to the steering wheel 36. The steering actuator is electrically connected to the electronic control unit 24 which outputs commands to control the steering actuator. It should be appreciated that the adjustable steering efforts system 34 is conventional and known in the art.

Figure 2:
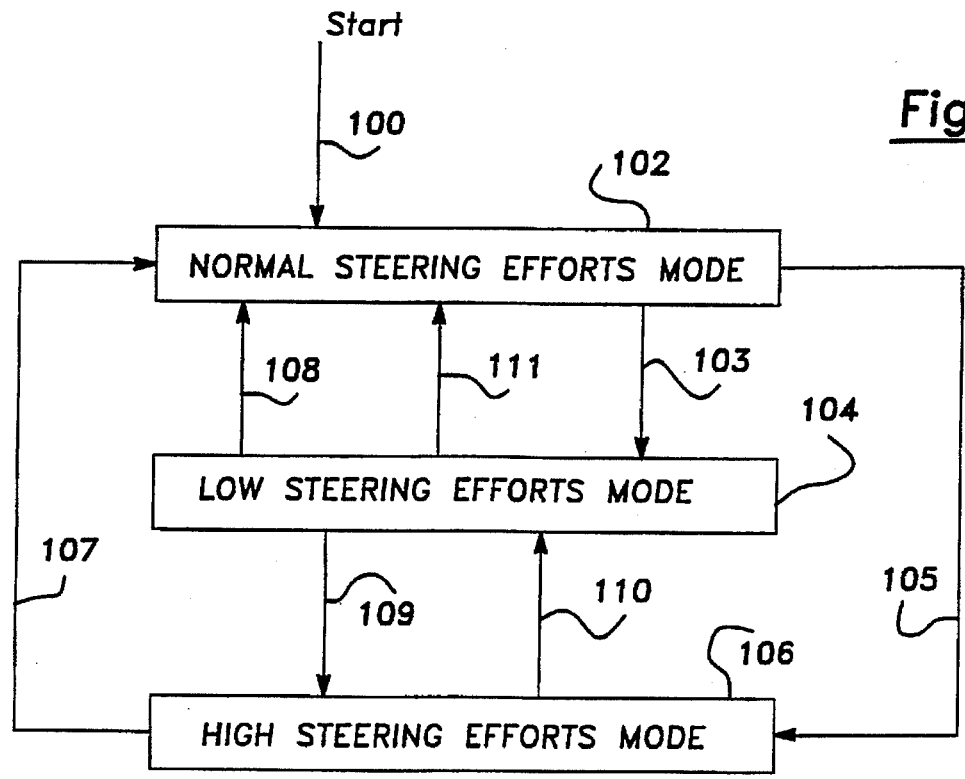
FIG. 2 is a state diagram for selection of suspension damping by a method, according to the present invention, for allowing enhanced driver selection of suspension damping and steering efforts for the motor vehicle of FIG. 1.

Referring to FIG. 2, a state diagram for selection of steering efforts by a method, according to the present invention, for allowing enhanced driver selection of suspension damping and steering efforts for the motor vehicle 10 is shown. The method begins or starts upon start-up or power-up of the vehicle 10. The electronic control unit 24 receives an input signal from the ignition switch 32. At power-up, the method is in state 102 for the NORMAL steering efforts mode and state 202 (FIG. 3) for the NORMAL damping mode. The driver selects either suspension damping or steering efforts with the switch 30 and selects either LOW or HIGH for steering efforts with the switch 28 or PLUSH or FIRM for suspension damping with the switch 28. From state 102, the method may advance along transistion line 103 to state 104 for the LOW steering efforts mode if the suspension damping is in either the PLUSH damping mode or NORMAL damping mode to be described. The method may also advance along transistion line 105 to state 106 for the HIGH steering efforts mode. It should be appreciated that the driver selects the desired steering efforts mode by actuating the select switch 28 and ride/steer switch 30.

Figure 3:
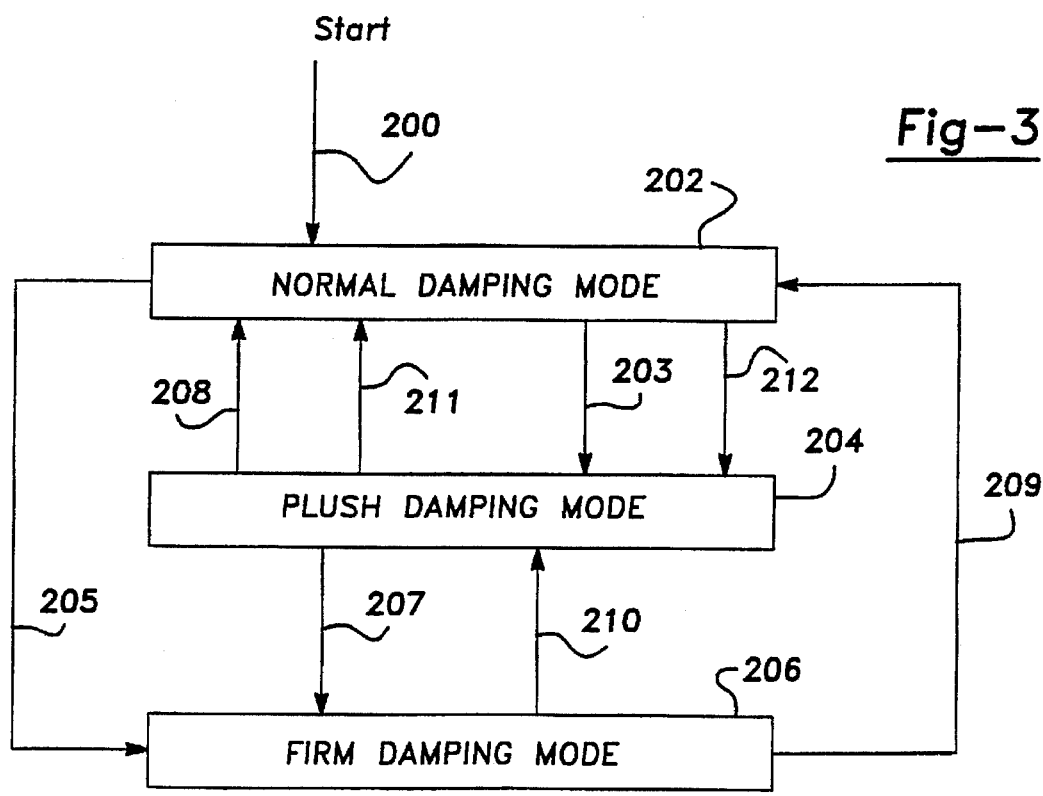
FIG. 3 is a state diagram for selection of steering efforts by a method, according to the present invention, for allowing enhanced driver selection of suspension damping and steering efforts for the motor vehicle of FIG. 1.

Referring to FIG. 3, a state diagram for selection of suspension damping by a method, according to the present invention, for allowing enhanced driver selection of suspension and steering efforts for the motor vehicle 10 is shown. The method begins or starts upon start-up or power-up of the vehicle 10. At power-up, the method is in state 202 for the NORMAL damping mode. From state 202, the method may advance along transistion line 203 to state 204 because the driver has selected the PLUSH damping mode or along transistion line 205 to state 206 because the driver has selected the FIRM damping mode and the steering efforts mode is in either the NORMAL steering efforts mode of state 102 or the HIGH steering efforts mode of state 106. It should be appreciated that the driver selects the desired suspension damping mode by actuating the select switch 28 and ride/steer switch 30.

The method, according to the present invention, allows enhanced driver selection of suspension damping and steering efforts for the motor vehicle 10. The method determines the suspension damping mode or the steering efforts mode selected by the driver. The electronic control unit 24 receives an input from the select switch 28 and ride/steer switch 30. It should be appreciated that the driver selects either the suspension damping or steering efforts first.

If the method determines that the suspension damping mode has been selected first by the driver, the method determines whether the FIRM, PLUSH or NORMAL damping mode has been selected. If the driver selects the FIRM damping mode in state 206, the method prevents the driver from selecting the LOW steering efforts mode of state 104. The electronic control unit 24 will not allow the driver to select the LOW steering efforts mode on the ride/steer switch 30. The method limits or allows the steering efforts mode presented to the driver for selection to the NORMAL steering efforts mode of state 102 or the HIGH steering efforts mode of state 106. It should be appreciated that, because of vehicle dynamic considerations, FIRM damping and LOW steering efforts are not allowed concurrently.

If the method determines that the steering efforts mode has been selected first by the driver, the method determines whether the LOW steering efforts mode of state 104 has been selected. If the LOW steering efforts mode has been selected, the method prevents the driver from selecting the FIRM damping mode of state 206. The electronic control unit 24 will not allow the driver to select the FIRM damping mode on the ride/steer switch 30. The method limits or allows the suspension damping mode presented to the driver for selection to the NORMAL damping mode of state 202 or the PLUSH damping mode of state 204. It should be appreciated that the method prevents the driver from selecting a poor combination, limiting the choices to only enhanced combinations and allowing the suspension damping and steering efforts to interact.

Referring again to FIG. 2, the method also allows the driver to select a change in the steering efforts mode for the motor vehicle 10. For example, the method allows the driver to select the HIGH steering efforts mode of state 106 along transistion line 105 from the NORMAL steering efforts mode of state 102 and select the NORMAL steering efforts mode of state 102 along transistion line 107 from the HIGH steering efforts mode of state 106 regardless of the suspension damping mode selected. The method also allows the driver to select the NORMAL steering efforts mode of state 102 along transistion line 108 from the LOW steering efforts mode of state 104 and select the HIGH steering efforts mode of state 106 along transistion line 109 from the LOW steering efforts mode of state 104.

The method also senses and monitors vehicle speed of the motor vehicle 10. The electronic control unit 24 reads a signal from a vehicle speed sensor (not shown). The method determines whether the sensed vehicle speed is less than a first predetermined speed such as ninety miles per hour (90 m.p.h.). In state 102, the motor vehicle 10 is in the NORMAL steering efforts mode. If the suspension damping mode is either the NORMAL damping mode of state 202 or the PLUSH damping mode of state 204, the method allows the driver to select the LOW steering efforts mode of state 104. However, the method advances along transistion line 103 to state 104 only if the sensed vehicle speed is less than the first predetermined speed. It should be appreciated that the electronic control unit 24 outputs a command to the steering assist actuator to adjust the amount of assist for the steering wheel 36 once the sensed vehicle speed is less than the first predetermined speed.

In state 106, the motor vehicle 10 is in the HIGH steering efforts mode. If the suspension damping mode is either the NORMAL damping mode of state 202 or the PLUSH damping mode of state 204, the method allows the driver to select the LOW steering efforts mode of state 104. However, the method advances along transistion line 110 only if the sensed vehicle speed is less than the first predetermined speed. It should be appreciated that the electronic control unit 24 outputs a command to the steering assist actuator to adjust the amount of assist for the steering wheel 36 once the sensed vehicle speed is less than the first predetermined speed.

In state 104, the motor vehicle 10 is in the LOW efforts steering mode. If the sensed vehicle speed is greater than a second predetermined speed such as ninety-five miles per hour (95 m.p.h.), the method advances along transistion line 111 and automatically selects or changes the steering efforts mode to the NORMAL steering efforts mode of state 102. It should be appreciated that the method automatically overrides the previously driver selected steering mode. It should also be appreciated that the electronic control unit 24 outputs a command to the steering assist actuator to adjust the amount of assist from the steering wheel once the sensed vehicle speed is greater than the second predetermined speed.

Referring again to FIG. 3, the method allows the driver to select a change in the suspension damping mode for the motor vehicle 10. For example, the method allows the driver to select the FIRM damping mode of state 206 along transistion line 205 from the NORMAL damping mode of state 202 if the steering efforts mode is not LOW. The method also allows the driver to select the FIRM damping mode of state 206 along transistion line 207 from the PLUSH damping mode of state 204 if the steering efforts mode is not LOW. The method allows the driver to select the NORMAL damping mode of state 202 along transistion line 208 from the PLUSH damping mode of state 204. The method also allows the driver to select the NORMAL damping mode of state 202 along transistion line 209 from the FIRM damping mode of state 206. The method further allows the driver to select the PLUSH damping mode of state 204 along transistion line 210 from the FIRM damping mode of state 206. It should be appreciated that the electronic control unit 24 outputs a command to the semi-active damper actuators 22 to adjust the damping force of the semi-active dampers 18 and 20.

The method senses and monitors vehicle speed of the motor vehicle 10. The method determines whether the sensed vehicle speed is less than a third predetermined speed such as eighty miles per hour (80 m.p.h.). The method also monitors vibration of the wheels 14 known as wheel hop in the art which is an indication of road conditions (e.g. rough or smooth). The method further monitors vehicle roll which is an indication that the motor vehicle 10 is in handling maneuvers as is known in the art. It should be appreciated that the electronic control unit 24 may receive an input of wheel hop and vehicle roll from any suitable source or sensor (not shown).

In state 202, the motor vehicle 10 is in the NORMAL damping mode. The method allows the driver to select the PLUSH damping mode of state 204. However, the method advances along transistion line 203 to state 204 only if the sensed vehicle speed is less than the third predetermined speed and the vehicle 10 is not in handling maneuvers. It should be appreciated that the electronic control unit 24 outputs a command to the semi-active damper actuators 22 to adjust the damping force of the semi-active dampers 18 and 20 once the electronic control unit 24 detects no handling maneuvers and the sensed vehicle speed is less than the third predetermined speed.

In state 204, the motor vehicle 10 is in the PLUSH damping mode. The method allows the driver to select the NORMAL damping mode of state 202. However, the method advances along transistion line 208 only if no wheel hop is detected. It should be appreciated that the electronic control unit 24 outputs a command to the semi-active damper actuators 22 to adjust the damping force of the semi-active dampers 18 and 20 once the electronic control unit 24 detects no wheel hop.

In state 206, the motor vehicle 10 is in the FIRM damping mode. The method allows the driver to select the NORMAL suspension damping mode of state 202. However, the method advances along transistion line 210 only if the sensed vehicle speed is less than the third predetermined speed and the vehicle is not in handling maneuvers. It should be appreciated that the electronic control unit 24 outputs a command to the semi-active damper actuators 22 to adjust the damping force of the semi-active dampers 18 and 20 once the electronic control unit 24 detects no handling maneuvers and the sensed vehicle speed is less than the third predetermined speed.

In state 206, the motor vehicle 10 is in the FIRM damping mode. The method allows the driver to select the NORMAL damping mode of state 202. However, the method advances along transistion line 209 only if the sensed vehicle speed is less than the first predetermined speed. It should be appreciated that the electronic control unit 24 outputs a command to the semi-active damper actuators 22 to adjust the damping force of the semi-active dampers 18 and 20 once the electronic control unit 24 detects that the vehicle speed is less than the first predetermined speed.

The method also automatically changes between the PLUSH, NORMAL and FIRM damping modes without driver input to enhance vehicle dynamic performance. For example, the method automatically changes the suspension damping modes as the motor vehicle 10 moves through certain speed ranges. It should be appreciated that, when the method determines that the suspension damping mode should be automatically changed, without driver input to enhance vehicle dynamics, the method also automatically changes the steering efforts mode in accordance with FIG. 2 such that the steering efforts mode corresponds with the new suspension damping mode.

In state 204, the motor vehicle 10 is in the PLUSH damping mode. If the sensed vehicle speed is greater than a fourth predetermined speed such as eighty-five miles per hour (85 m.p.h.) or handling maneuvers are detected, the method advances along transistion line 211 and automatically selects or changes the suspension damping mode to the NORMAL damping mode of state 202. It should be appreciated that the method automatically overrides the previously driver selected ride mode. It should also be appreciated that the electronic control unit 24 outputs a command to the semi-active damper actuators 22 to adjust the damping force of the semi-active dampers 18 and 20 once the sensed vehicle speed is greater than the fourth predetermined speed or handling maneuvers are detected.

In state 202, the motor vehicle 10 is in the NORMAL damping mode. If the sensed vehicle speed is greater than the second predetermined speed, the method advances along transistion line 205 and automatically selects or changes the suspension damping mode to the FIRM damping mode of state 206. It should also be appreciated that if the NORMAL damping mode and LOW steering efforts is selected by the driver, and a sensed vehicle speed threshold is exceeded such that the damping mode automatically changes to FIRM, the method also automatically changes the steering efforts from LOW to NORMAL to avoid the FIRM damping and LOW steering efforts combination.

In state 202, the motor vehicle 10 is in the NORMAL damping mode. If the sensed vehicle speed is less than the third predetermined speed and wheel hop is detected and no handling maneuvers are detected, the method advances along transistion line 212 and automatically selects or changes the suspension damping mode to the PLUSH damping mode of state 204. It should be appreciated that the electronic control unit 24 outputs a command to the semi-active damper actuators 22 to adjust the damping force of the semi-active dampers 18 and 20 once wheel hop is detected and the sensed vehicle speed is less than the third predetermined speed and no handling maneuvers are detected.

Accordingly, the method allows interaction between the adjustable suspension damping and steering efforts with consideration for each other. By using the method to preclude poor combinations, base suspension damping and base steering efforts can be designed closer to the extremes than if no interaction was possible. This allows enhanced handling over unilateral steering and suspension adjustment non-interacting systems. The method detects current vehicle speed, steering inputs and road conditions and determines the most appropriate ride mode for those conditions and overrides the previously driver selected ride mode.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may practiced other than as specifically described.

What is claimed is:

1. A method for integrating a plurality of vehicle dynamic systems for a motor vehicle, said method comprising the steps of:

providing a plurality of vehicle dynamic systems from a group comprising a suspension damping system, a steering efforts system, a brake system and a traction control system for the motor vehicle;

allowing interaction between the vehicle dynamic systems; and adjusting at least one of the vehicle dynamic systems based on predetermined conditions of at least another of the vehicle dynamic systems.

2. A method for allowing enhanced driver selection of suspension damping and steering efforts for a motor vehicle, said method comprising the steps of:

presenting to a driver of the motor vehicle a plurality of suspension damping modes and a plurality of steering efforts modes for the motor vehicle;

allowing the driver to select only predetermined combinations of the suspension damping modes and steering efforts modes; and adjusting the suspension damping and steering efforts of the motor vehicle based on the predetermined combination selected by the driver.

3. A method as set forth in claim 2 wherein the plurality of suspension damping modes comprises FIRM, damping, PLUSH damping and NORMAL damping.

4. A method as set forth in claim 3 wherein the plurality of steering efforts modes comprises HIGH steering, LOW steering and NORMAL steering.

5. A method as set forth in claim 4 wherein said step of allowing comprises allowing the driver to select one from the group comprising FIRM damping and HIGH steering, FIRM damping and NORMAL steering, PLUSH damping and HIGH steering, PLUSH damping and LOW steering, PLUSH damping and NORMAL steering, NORMAL damping and HIGH steering, NORMAL damping and LOW steering, and NORMAL damping and NORMAL steering.

6. A method as set forth in claim 5 including the step of allowing the driver to select either the suspension damping mode or the steering efforts mode first and selecting the other one of the suspension damping modes or steering efforts mode second that form one of the predetermined combinations.

7. A method as set forth in claim 2 including the step of monitoring at least one predetermined condition after said step of adjusting.

8. A method as set forth in claim 7 including the step of determining whether the at least one predetermined condition has been met.

9. A method as set forth in claim 8 including the step of allowing the driver to select either the steering efforts mode or the suspension damping mode and enabling the selected mode once the at least one predetermined condition has been met.

10. A method as set forth in claim 8 including the step of automatically changing the steering efforts mode or the suspension damping mode if the at least one predetermined condition has been met.

11. A method for allowing enhanced driver selection of suspension damping and steering efforts for a motor vehicle, said method comprising the steps of:

presenting to a driver of the motor vehicle FIRM, NORMAL and PLUSH damping modes and HIGH, LOW and NORMAL steering efforts modes for the motor vehicle;

allowing the driver to select only predetermined combinations of the FIRM, NORMAL and PLUSH suspension damping modes and HIGH, LOW and NORMAL steering efforts modes; and adjusting the suspension damping and steering efforts of the motor vehicle based on the predetermined combination selected by the driver.

12. A method as set forth in claim 11 including the step of selecting either the suspension damping mode or the steering efforts mode after said step of presenting.

13. A method as set forth in claim 12 including the step of allowing the driver to select the NORMAL steering efforts mode or the HIGH steering efforts mode when the motor vehicle is in the LOW steering efforts mode.

14. A method as set forth in claim 12 including the step of allowing the driver to select the NORMAL steering efforts mode when the motor vehicle is in the HIGH steering efforts mode or to select the HIGH steering efforts mode when the motor vehicle is in the NORMAL steering efforts mode.

15. A method as set forth in claim 12 including the step of allowing the driver to select the FIRM damping mode when the motor vehicle is either in the NORMAL damping mode or the PLUSH damping mode and when the motor vehicle is either in the HIGH steering efforts mode or the NORMAL steering efforts mode.

16. A method as set forth in claim 12 including the step of monitoring vehicle speed, wheel hop and vehicle roll of the motor vehicle.

17. A method as set forth in claim 16 including the step of allowing the driver to select the LOW steering efforts mode when the motor vehicle is either in the NORMAL damping mode or the PLUSH damping mode and the motor vehicle is either in the NORMAL steering efforts mode or the HIGH steering efforts mode.

18. A method as set forth in claim 16 including the step of automatically changing the steering efforts mode to the NORMAL steering efforts mode when the motor vehicle is in the LOW steering efforts mode and the vehicle speed is greater than a predetermined speed.

19. A method as set forth in claim 16 including the step of allowing the driver to select the suspension damping mode to the NORMAL damping mode when the motor vehicle is in the FIRM damping mode.

20. A method as set forth in claim 16 including the step of automatically changing the suspension damping mode to the FIRM damping mode when the motor vehicle is in the NORMAL damping mode and the vehicle speed is greater than a predetermined speed.

* * * * *